US012294181B2

(12) United States Patent
Karita et al.

(10) Patent No.: US 12,294,181 B2
(45) Date of Patent: May 6, 2025

(54) CONNECTOR

(71) Applicant: SUMITOMO WIRING SYSTEMS, LTD., Mie (JP)

(72) Inventors: Masahiro Karita, Mie (JP); Ai Hirano, Mie (JP); Takahiro Chikusa, Mie (JP); Yasuo Imai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 419 days.

(21) Appl. No.: 17/949,931

(22) Filed: Sep. 21, 2022

(65) Prior Publication Data

US 2023/0101364 A1 Mar. 30, 2023

(51) Int. Cl.
*H01R 13/627* (2006.01)
*H01R 43/042* (2006.01)

(52) U.S. Cl.
CPC ..... *H01R 13/6272* (2013.01); *H01R 43/0421* (2013.01)

(58) Field of Classification Search
CPC ............ H01R 13/6272; H01R 43/0421; H01R 2103/00; H01R 9/0518
USPC .................................................. 439/583, 582
See application file for complete search history.

(56) References Cited

U.S. PATENT DOCUMENTS 4,360,244 A * 11/1982 Forney, Jr. ............. H01R 24/50 439/582
6,283,747 B1 * 9/2001 Legiret ................... F23D 14/32 432/12
6,283,790 B1 * 9/2001 Idehara ................ H01R 13/504 439/582
7,121,883 B1 * 10/2006 Petersen ................ H01R 13/42 439/582
8,790,121 B2 * 7/2014 Hirakawa .............. H01R 24/50 439/582
2005/0255747 A1 * 11/2005 Yamane ................. H01R 24/40 439/583
2006/0094305 A1 5/2006 Masaki et al.
2009/0017678 A1 * 1/2009 Meier .................. H01R 9/0518 439/582
2010/0317226 A1 * 12/2010 Schmid .................. H01R 24/54 439/582
2018/0034172 A1 2/2018 Singhammer et al.

* cited by examiner

*Primary Examiner* — Gary F Paumen
(74) *Attorney, Agent, or Firm* — Venjuris, P.C.

(57) ABSTRACT

Technology of the present invention suppresses a decrease in the impedance of an inner conductor. A connector 10 includes an inner conductor 21, an outer conductor 41 that surrounds the inner conductor 21, and a dielectric 61 arranged between the inner conductor 21 and the outer conductor 41. The dielectric 61 includes a cavity 63 that extends in a predetermined direction and a locking hole 64 formed in an inner peripheral face of the cavity 63. The inner conductor 21 includes an inner conductor body 23 arranged in the cavity 63, and a locking portion 24 that bulges from the inner conductor body 23 and can enter and be locked to the locking hole 64. The locking portion 24 extends along the predetermined direction and is shaped as a double-supported beam whose upper and lower end portions are supported by the inner conductor body 23.

5 Claims, 11 Drawing Sheets

CONNECTOR

CROSS-REFERENCE TO RELATED APPLICATIONS

This application is based on and claims priority from Japanese Patent Application No. 2021-157713, filed on Sep. 28, 2021, with the Japan Patent Office, the disclosure of which is incorporated herein in its entirety by reference.

TECHNICAL FIELD

The present disclosure relates to a connector.

BACKGROUND

A connector is disclosed in Japanese Patent Laid-open Publication No. 2018-512707. In this connector, a second conductor component attached to the leading end of a coaxial cable is connected to a first conductor component. The second conductor component includes an outer conductor and an inner conductor held at a central position within the outer conductor by an insulating component. No description is given regarding the structure for holding the inner conductor. Japanese Patent Laid-open Publication No. 2006-128032 describes that a lance is provided in a socket contact, and the lance is locked to a locking hole of a connector housing.

SUMMARY

The technology of Japanese Patent Laid-open Publication No. 2006-128032 can be applied as the structure for holding the inner conductor in Japanese Patent Laid-open Publication No. 2018-512707. However, since the lance is supported in a cantilevered manner, a gap may be formed around the lance, and the impedance may decrease.

In view of this, an object of the present disclosure is to provide technology capable of suppressing a decrease in the impedance of the inner conductor.

A connector according to the present disclosure includes: an inner conductor; an outer conductor configured to surround the inner conductor; and a dielectric arranged between the inner conductor and the outer conductor, wherein the dielectric includes: a cavity extending in a predetermined direction, and a locking hole formed in an inner peripheral face of the cavity, the inner conductor includes: an inner conductor body arranged in the cavity, and a locking portion that bulges from the inner conductor body and is configured to enter and be locked to the locking hole, and the locking portion extends in the predetermined direction and is shaped as a double-supported beam whose upper and lower end portions are supported by the inner conductor body.

According to the present disclosure, it is possible to suppress a decrease in the impedance of the inner conductor.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
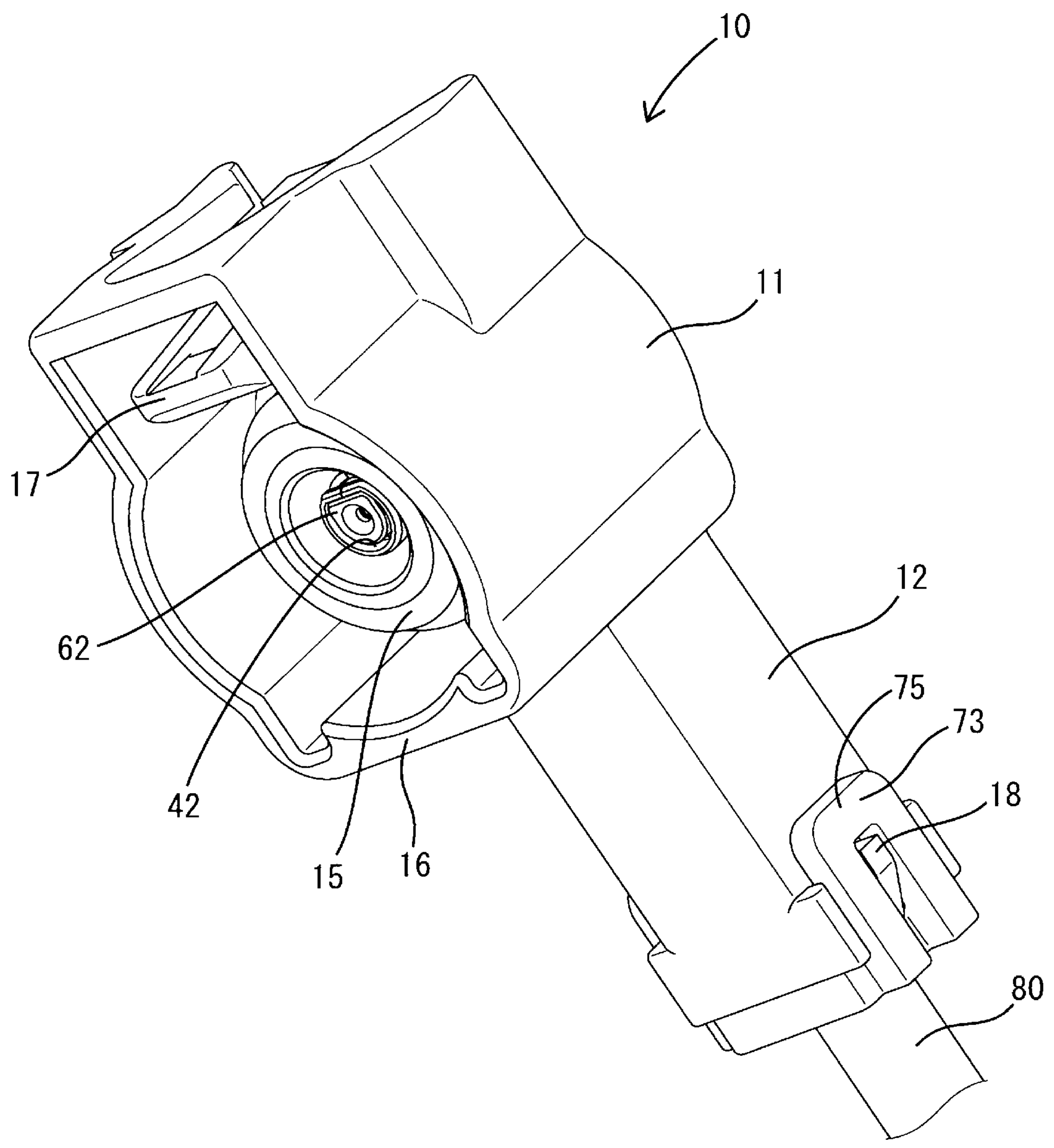
FIG. 1 is a perspective view of a connector according to a first embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure will be listed and described.

(1) A connector according to the present disclosure includes: an inner conductor; an outer conductor configured to surround the inner conductor; and a dielectric arranged between the inner conductor and the outer conductor, wherein the dielectric includes: a cavity extending in a predetermined direction, and a locking hole formed in an inner peripheral face of the cavity, the inner conductor includes: an inner conductor body arranged in the cavity, and a locking portion that bulges from the inner conductor body and is configured to enter and be locked to the locking hole, and the locking portion extends in the predetermined direction and is shaped as a double-supported beam whose upper and lower end portions are supported by the inner conductor body.

According to this connector, due to the locking portion being locked to the locking hole, it is possible to suppress the case where the inner conductor comes out of the dielectric. Moreover, the locking portion is shaped as a double-sided beam whose upper and lower end portions are supported by the inner conductor body. For this reason, according to this connector, a decrease in the impedance of the inner conductor can be suppressed more than in the case of a configuration in which the locking portion is a normal lance.

(2) It is preferable that the locking portion is curved.

According to this configuration, it is possible to reduce the insertion force required when inserting the inner conductor into the dielectric.

(3) It is preferable that the connector further includes a second inner conductor configured to be electrically connected to the inner conductor, an entry hole is formed in an inner peripheral face of the cavity at a position corresponding to the locking hole, the second inner conductor is arranged in the entry hole, and the locking hole and the entry hole are arranged coaxially with each other via the cavity.

According to this configuration, the locking hole and the entry hole can be punched out at the same time using the same straight die.

(4) It is preferable that the locking portion includes a protruding face bulging from the inner conductor body, and a receding face formed on a reverse side of the protruding face, and in a state where the second inner conductor is normally connected to the inner conductor, a leading end of the second inner conductor is arranged inward of the receding face.

According to this configuration, if the inner conductor is in a partially-inserted state, the leading end of the second inner conductor abuts on the inner conductor. For this reason, it can be easily determined whether or not the inner conductor is in a partially-inserted state.

(5) It is preferable that a guide groove is formed in an inner peripheral face of the cavity, and the guide groove extends along the predetermined direction and is in communication with the locking hole.

According to this configuration, the locking portion of the inner conductor inserted into the cavity can be guided to the locking hole by the guide groove.

Detailed Description of Embodiments of Present Disclosure

Specific examples of the present disclosure will be described below with reference to the drawings. It should be noted that the present invention is not limited to these examples, but rather is indicated by the scope of claims, and is intended to include all modifications within a meaning and scope equivalent to the scope of claims.

First Embodiment

Figure 5:
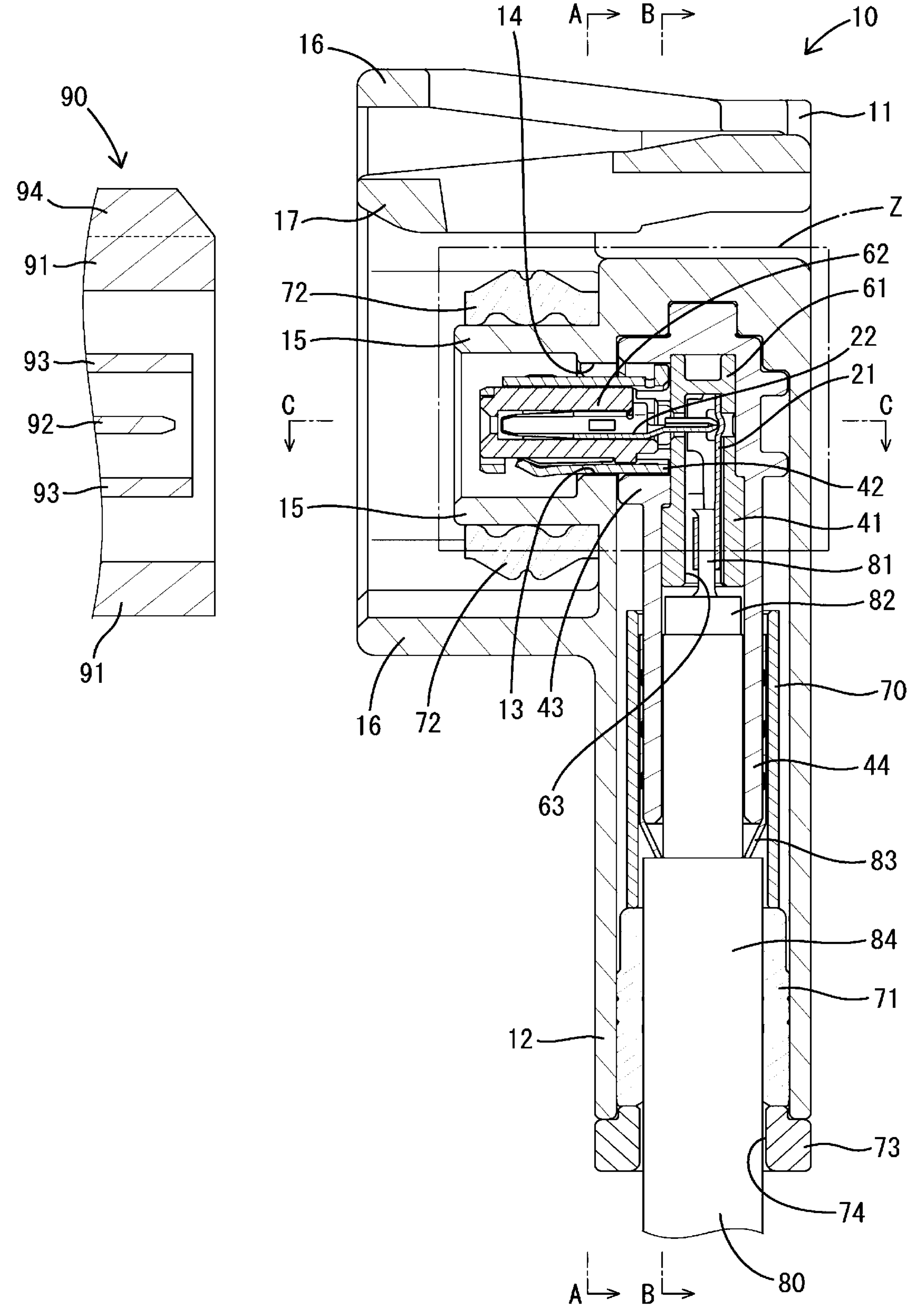
FIG. 5 is a side cross-sectional view of the connector and a partner connector.

FIG. 1 shows a connector 10 of a first embodiment. In the following description, the up-down direction shown in FIG. 5 is defined as-is as the up-down direction of the connector 10. Also, the left side shown in FIG. 5 is the front side of the connector 10, and the right side is the rear side of the connector 10. Moreover, the left-right direction in a front view of the connector 10 is the left-right direction of the connector 10. Note that the up-down direction of the connector 10 corresponds to an example of the "predetermined direction" of the present invention.

Overview of Connector 10

As shown in FIG. 1, the connector 10 is L-shaped. As shown in FIG. 5, a partner connector 90 is fitted to one end side of the connector 10, and an electric wire 80 is electrically connected to the other end side of the connector 10. The electric wire 80 is a shielded electric wire, and is configured as a coaxial cable in the present embodiment. The electric wire 80 includes an inner conductor 81, an insulator 82, a shield layer 83, and a sheath 84. The insulator 82 surrounds the inner conductor 81. The shield layer 83 surrounds the insulator 82. The sheath 84 surrounds the shield layer 83. The partner connector 90 includes a partner housing 91, a partner inner conductor 92, and a partner outer conductor 93.

As shown in FIG. 5, the connector 10 includes a housing 11, a first inner conductor 21, a second inner conductor 22, a first outer conductor 41, a second outer conductor 42, a first dielectric 61, a second dielectric 62, a sleeve 70, a first seal member 71, a second seal member 72, and retaining members 73.

Configuration of Housing 11

The housing 11 is electrically insulating and is made of a synthetic resin. The housing 11 is L-shaped as shown in FIG. 1. As shown in FIGS. 1 and 5, the housing 11 includes a housing body 12, a fitting hole 13, a fitting groove 14, an inner hood portion 15, an outer hood portion 16, a lock arm 17, and first retaining and locking portions 18.

As shown in FIG. 5, the housing body 12 is shaped as tube (more specifically, a square tube) that extends in the up-down direction. The lower end of the housing body 12 is open downward, and the upper end is closed.

As shown in FIG. 5, the fitting hole 13 is formed so as to extend from the inner peripheral surface of the housing body 12 to the outside. In other words, the fitting hole 13 extends in the front-rear direction through a wall portion (the front wall in the present embodiment) of the housing body 12. The fitting hole 13 is open on the front side of the housing 11. The fitting hole 13 is provided on the upper end side of the center of the housing body 12 in the up-down direction. The second outer conductor 42 is fitted into the fitting hole 13.

As shown in FIG. 5, the fitting groove 14 extends along the front-rear direction in the inner peripheral surface of the fitting hole 13. The fitting groove 14 is open on the front and rear sides.

As shown in FIG. 5, the inner hood portion 15 is shaped as a tube that projects forward from a portion of the housing body 12 that surrounds the fitting hole 13. The inner hood portion 15 is shaped as a tube (more specifically, a cylinder) that extends in the front-rear direction. The inner space of the inner hood portion 15 is in communication with the fitting hole 13 and is open on the front side of the housing 11.

As shown in FIG. 5, the outer hood portion 16 surrounds the outer peripheral surface of the inner hood portion 15. The outer hood portion 16 is shaped as a tube that extends in the front-rear direction. The inner space of the outer hood portion 16 is open on the front side of the housing 11. The front end of the outer hood portion 16 is located forward of the front end of the inner hood portion 15.

Figure 7:
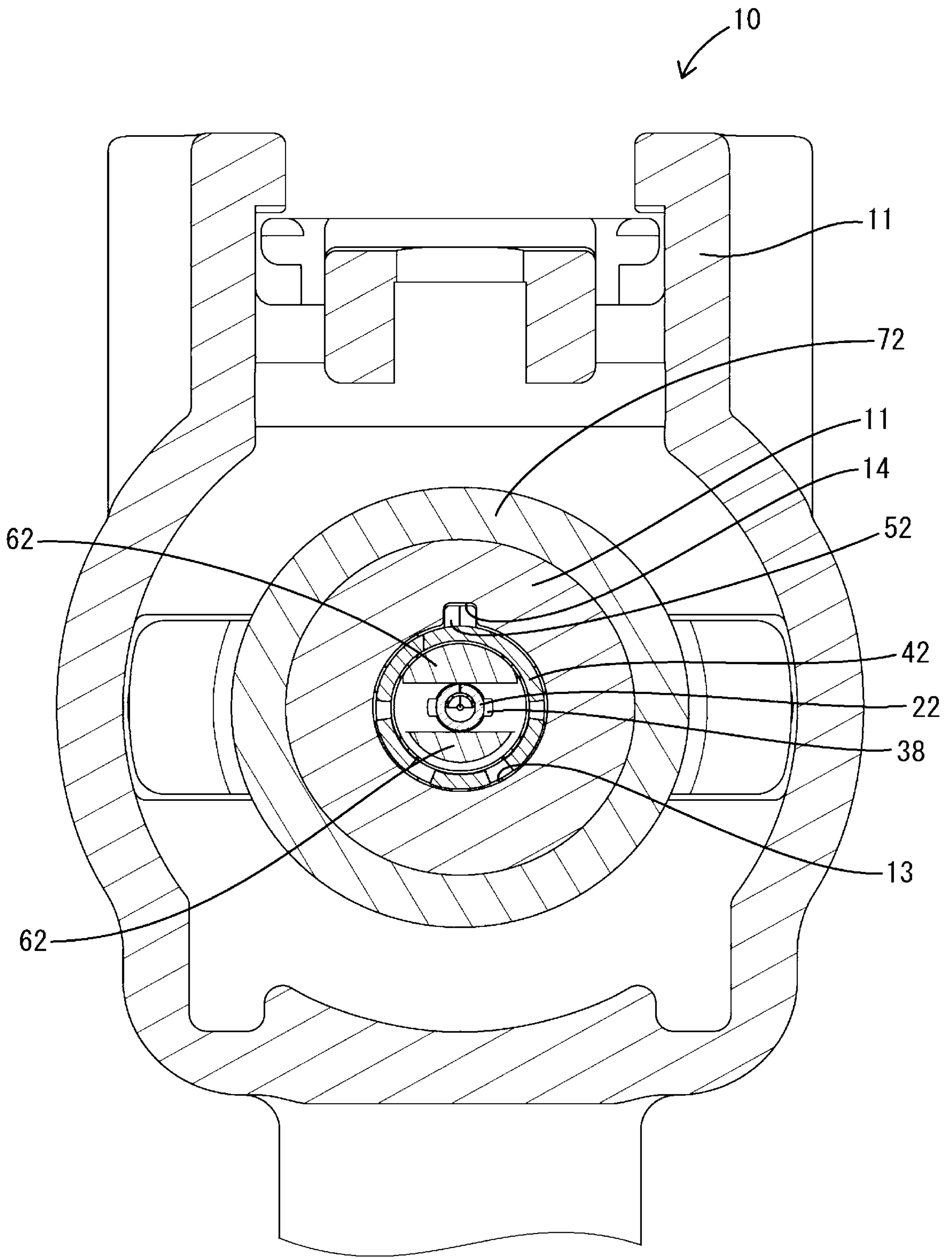
FIG. 7 is a cross-sectional view taken along line A-A in FIG. 5.
Figure 8:
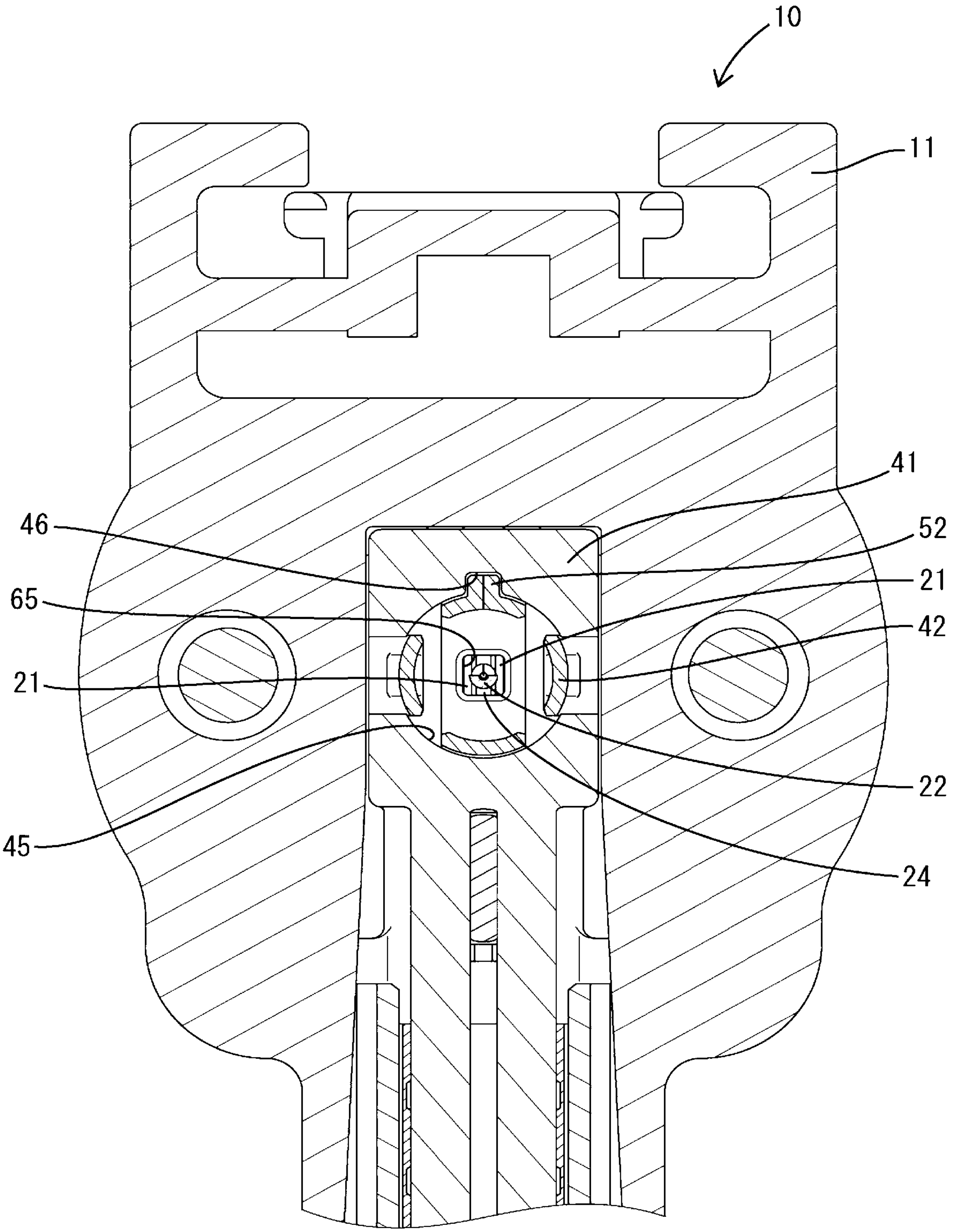
FIG. 8 is a cross-sectional view taken along line B-B in FIG. 5.

As shown in FIG. 5, the lock arm 17 is located inside the outer hood portion 16. The lock arm 17 is shaped so as to extend in the front-rear direction. The front end side of the lock arm 17 is supported so as to be swingable in the up-down direction. The lock arm 17 is supported by the outer hood portion 16 as shown in FIGS. 7 and 8. The lock arm 17 is locked to a partner locking portion 94 of the partner housing 91 of the partner connector 90 (see FIG. 5).

As shown in FIG. 1, the first retaining and locking portions 18 are shaped so as to project from outer peripheral faces (left and right side faces in the present embodiment) of the housing body 12. The first retaining and locking portions 18 are provided in a lower end portion of the housing body 12. The retaining members 73 engage with the first retaining and locking portions 18.

Configuration of First Inner Conductor 21

Figure 4:
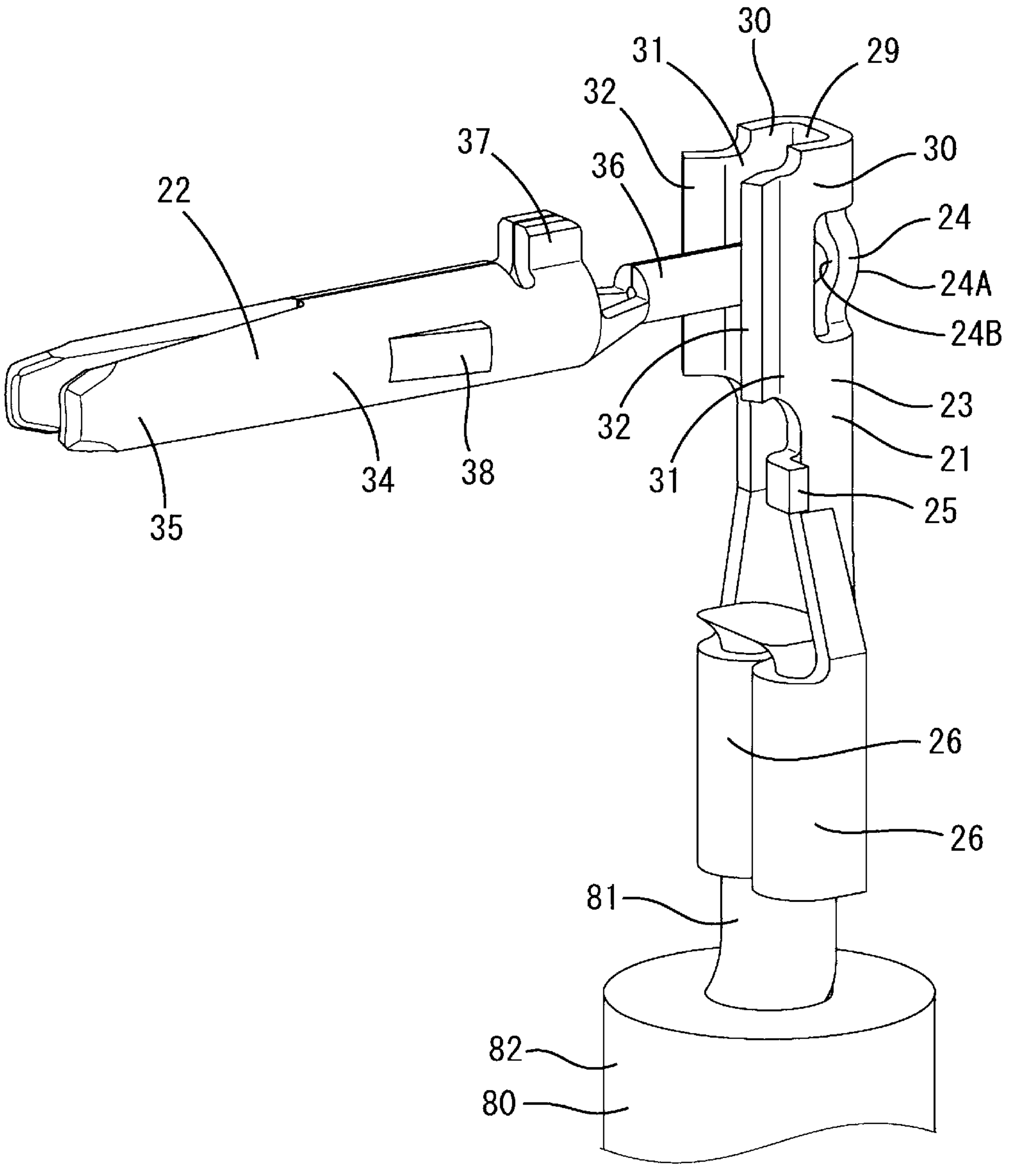
FIG. 4 is a perspective view of a first inner conductor and a second inner conductor.
Figure 6:
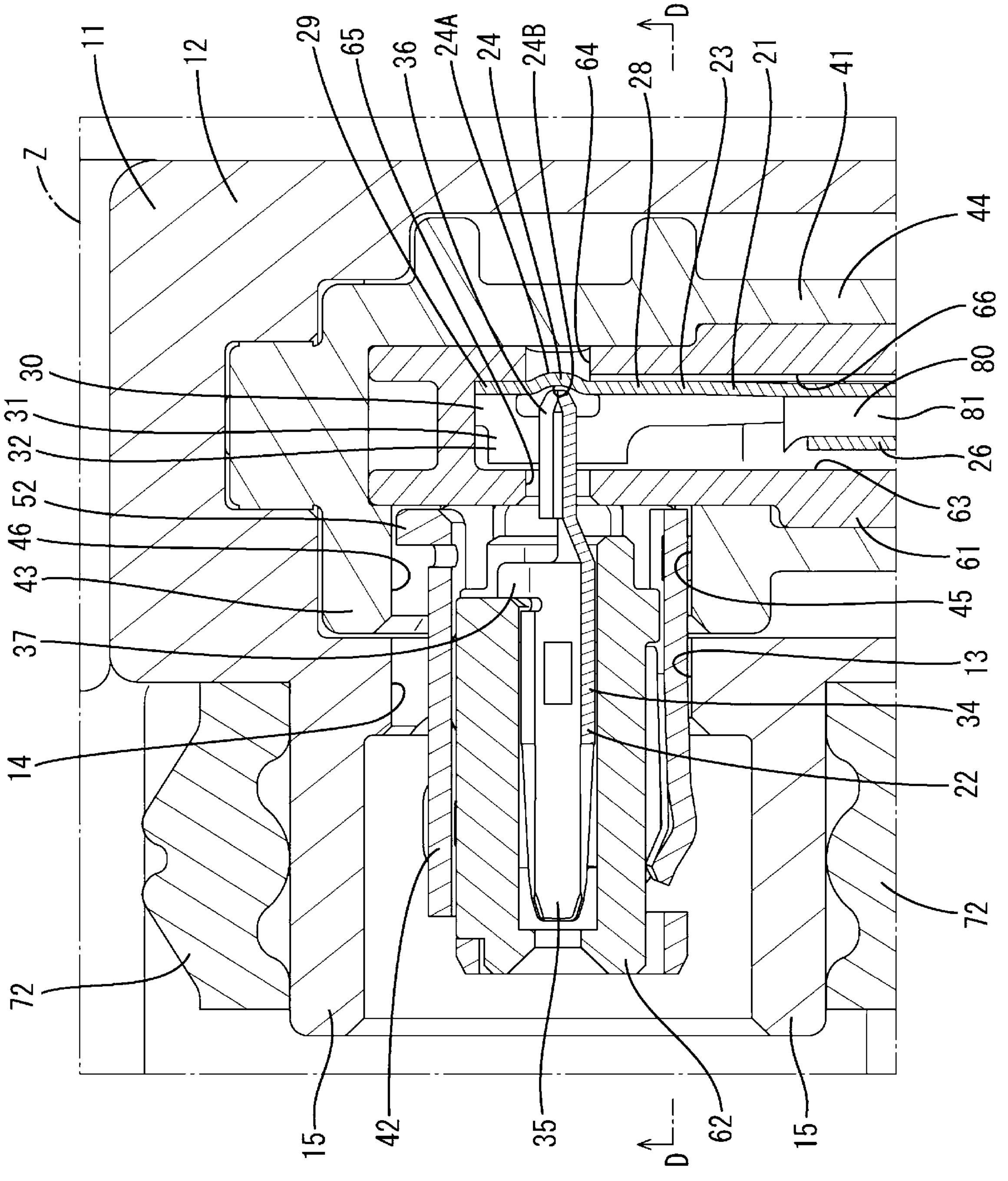
FIG. 6 is an enlarged view of a region Z shown in FIG. 5.

The first inner conductor 21 corresponds to an example of the "inner conductor" of the present invention. The first inner conductor 21 is a plate-shaped member, and is formed by bending a metal plate. As shown in FIGS. 4 to 6, the first inner conductor 21 is shaped so as to extend in the up-down direction. The first inner conductor 21 includes a first inner conductor body 23, a locking portion 24, a stabilizer 25, and a barrel portion 26.

Figure 10:
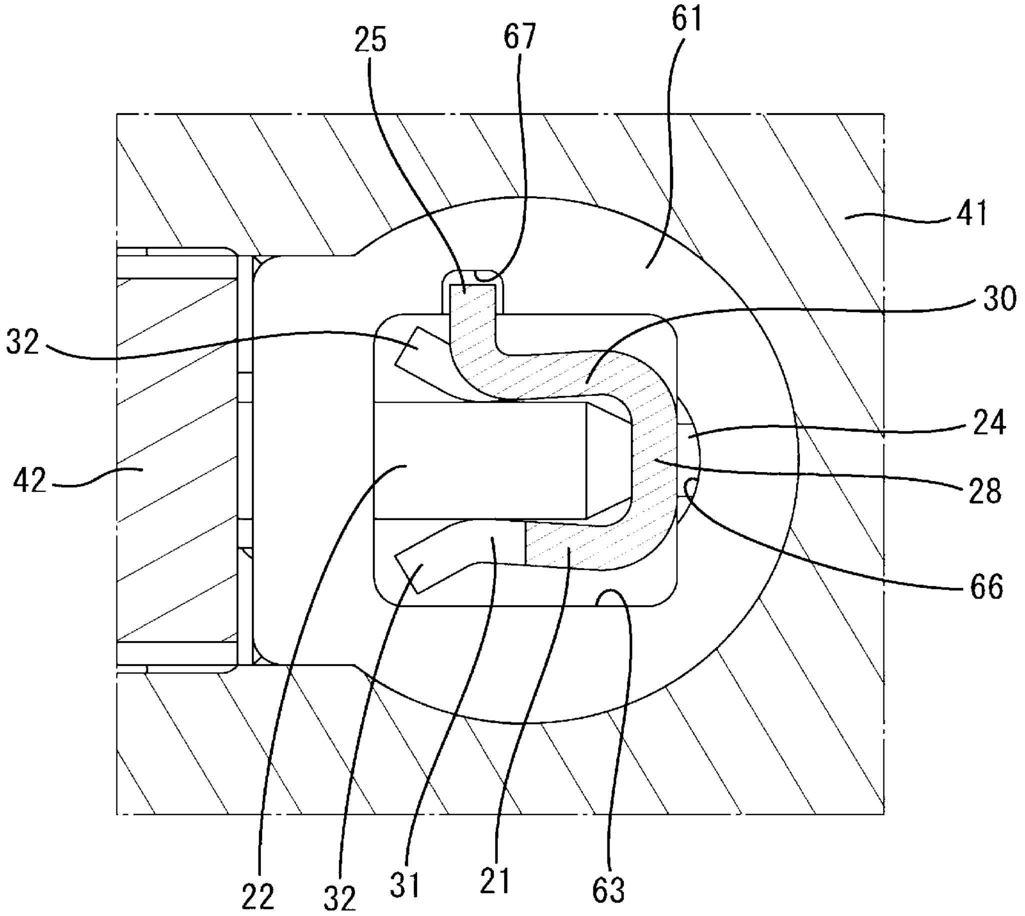
FIG. 10 is a cross-sectional view of a region including a first inner conductor and a first dielectric, at a cross-section taken along line D-D in FIG. 6.
Figure 11:
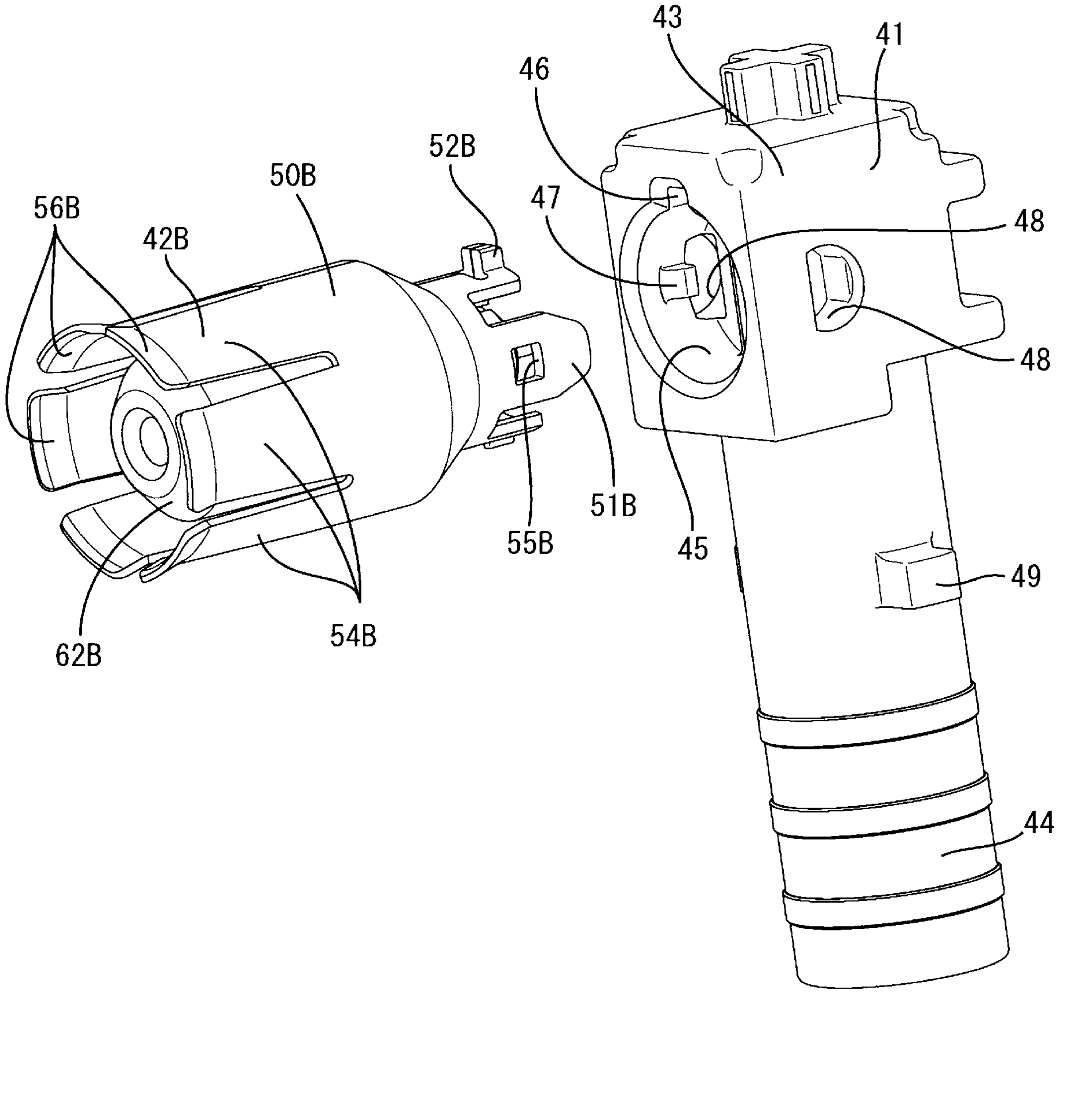
FIG. 11 is a perspective view showing a state before another type of second outer conductor has been fitted to the first outer conductor.

The first inner conductor body 23 corresponds to an example of the "inner conductor body" of the present invention. As shown in FIGS. 4, 6 and 10, the first inner conductor body 23 includes a first bottom plate portion 28, a second bottom plate portion 29, a pair of side plate portions 30, a pair of first connection portions 31, and a pair of invitation portions 32. The first bottom plate portion 28 and the second bottom plate portion 29 are spaced apart from each other in the up-down direction. The thickness directions of the first bottom plate portion 28 and the second bottom plate portion 29 conform to the front-rear direction. The pair of side plate portions 30 are respectively continuous with the left and right sides of the first bottom plate portion 28 and the second bottom plate portion 29 and project forward from the same. The pair of side plate portions 30 are spaced apart from each other in the left-right direction. The pair of first connection portions 31 extend forward from the front ends of the pair of side plate portions 30. The pair of first connection portions 31 extend from portions, with respect to the up-down direction, of the front ends of the pair of side plate portions 30. The shortest gap between the pair of first connection portions 31 is smaller than the gap between the pair of side plate portions 30. The pair of guide portions 32 extend forward from the front ends of the pair of first connection portions 31. The distance between the pair of guide portions 32 increases as they extend forward.

As shown in FIG. 6, the locking portion 24 extends in the up-down direction. The locking portion 24 is shaped as a double-supported beam whose upper and lower end portions are supported by the first inner conductor body 23. The lower end portion of the locking portion 24 is supported by the upper end portion of the first bottom plate portion 28, and the upper end portion of the locking portion 24 is supported by the lower end portion of the second bottom plate portion 29. The locking portion 24 is plate-shaped and can undergo bending deformation in the front-rear direction. The thickness direction of the locking portion 24 conforms to the front-rear direction. The locking portion 24 bulges rearward from the first inner conductor body 23. The locking portion 24 is curved. The locking portion 24 has a protruding face 24A that bulges from the first inner conductor body 23 and a receding face 24B formed on the reverse side of the protruding face 24A. In other words, the protruding face 24A is formed on the rear face of the locking portion 24, and the receding face 24B is formed on the front face of the locking portion 24.

As shown in FIGS. 4 and 10, the stabilizer 25 is provided at the front end of one side plate portion 30 (in the present embodiment, the right side plate portion 30) out of the two of side plate portions 30. The stabilizer 25 is spaced apart from the pair of first connection portions 31 in the up-down direction. More specifically, the stabilizer 25 is arranged below the first connection portions 31. The stabilizer 25 is bent so as to project outward in the left-right direction.

As shown in FIG. 4, the barrel portion 26 is crimped to the inner conductor 81 of the electric wire 80 and is electrically connected to the inner conductor 81.

Configuration of First Outer Conductor 41

Figure 3:
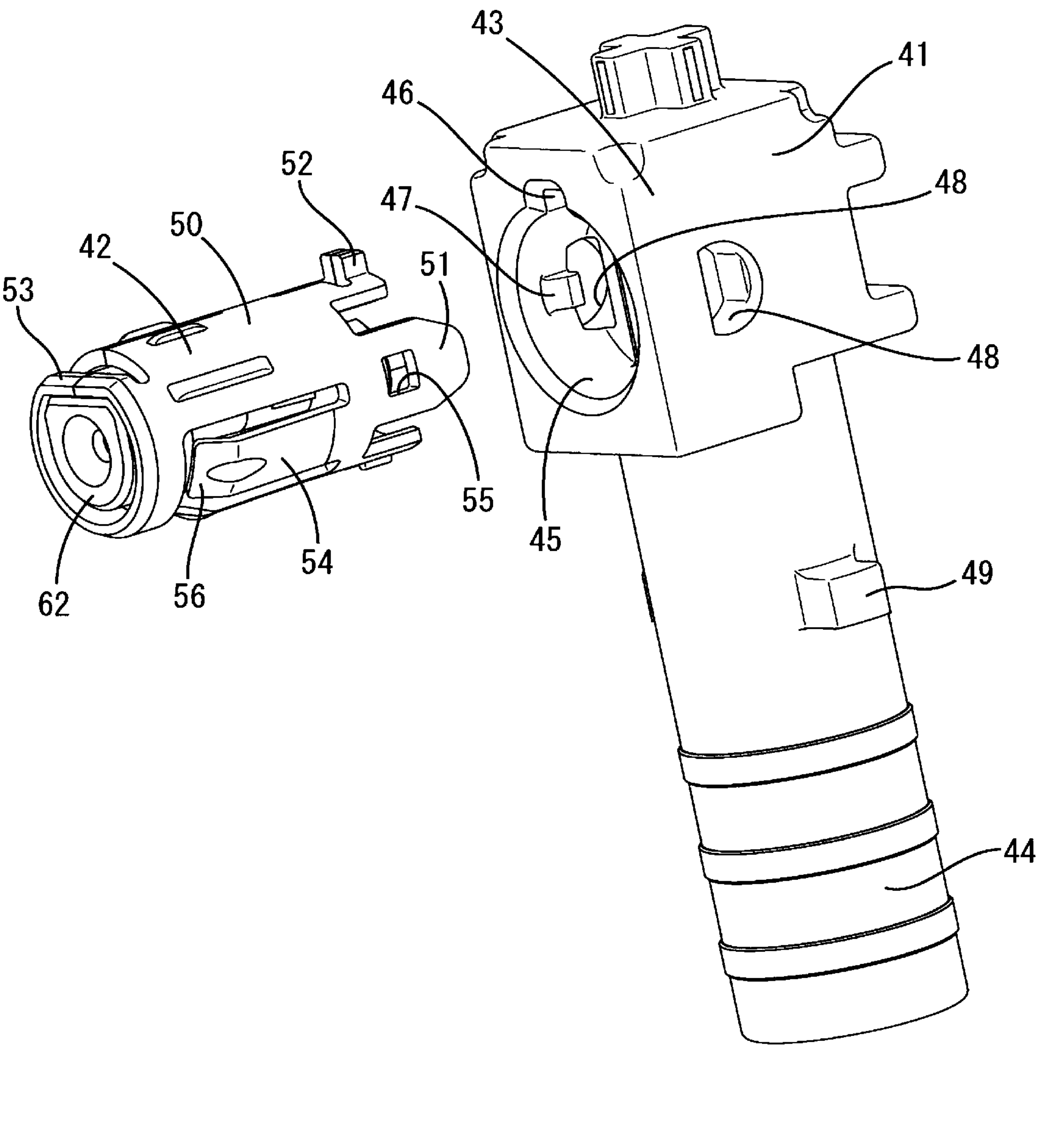
FIG. 3 is a perspective view showing a state before a second outer conductor has been fitted to a first outer conductor.

The first outer conductor 41 is a member formed with a tubular shape by casting or cutting. "Formed with a tubular shape by casting or cutting" means perform the step of formation with a tubular shape by performing casting or cutting, and does not mean formation with a tubular shape by bending a metal plate that has been cut. Note that casting also includes die casting. As shown in FIG. 5, the first outer conductor 41 surrounds the first inner conductor 21. As shown in FIGS. 3 and 5, the first outer conductor 41 includes an accommodation portion 43, a tubular portion 44, a conductor-side fitting hole 45, a conductor-side fitting groove 46, first lock portions 47, through holes 48, and sleeve positioning portions 49.

As shown in FIGS. 3 and 5, the accommodation portion 43 is formed by forming an opening in one end side of the first outer conductor 41. The opening direction of the accommodation portion 43 is the forward direction. The tubular portion 44 extends in the up-down direction. The tubular portion 44 is formed by forming an opening on the other end side of the first outer conductor 41. The opening direction of the tubular portion 44 is the downward direction. In other words, the opening direction of the accommodation portion 43 intersects (in the present embodiment, is orthogonal to) the opening direction of the tubular portion 44. The inner space of the first outer conductor 41 is shaped such that the space extending rearward from the opening of the accommodation portion 43 and the space extending upward from the opening of the tubular portion 44 are orthogonal to each other.

The conductor-side fitting hole 45 is formed inside the accommodation portion 43 as shown in FIGS. 3 and 5. The conductor-side fitting hole 45 passes through a peripheral wall of the tubular portion 44 and is in communication with the inner space of the tubular portion 44. The conductor-side fitting hole 45 is open on the front side of the first outer conductor 41. The conductor-side fitting hole 45 is arranged on the upper end side of the center of the first outer conductor 41 in the up-down direction. The conductor-side fitting groove 46 extends along the front-rear direction in the inner peripheral surface of the conductor-side fitting hole 45. The conductor-side fitting groove 46 is open on the front and rear sides.

Figure 9:
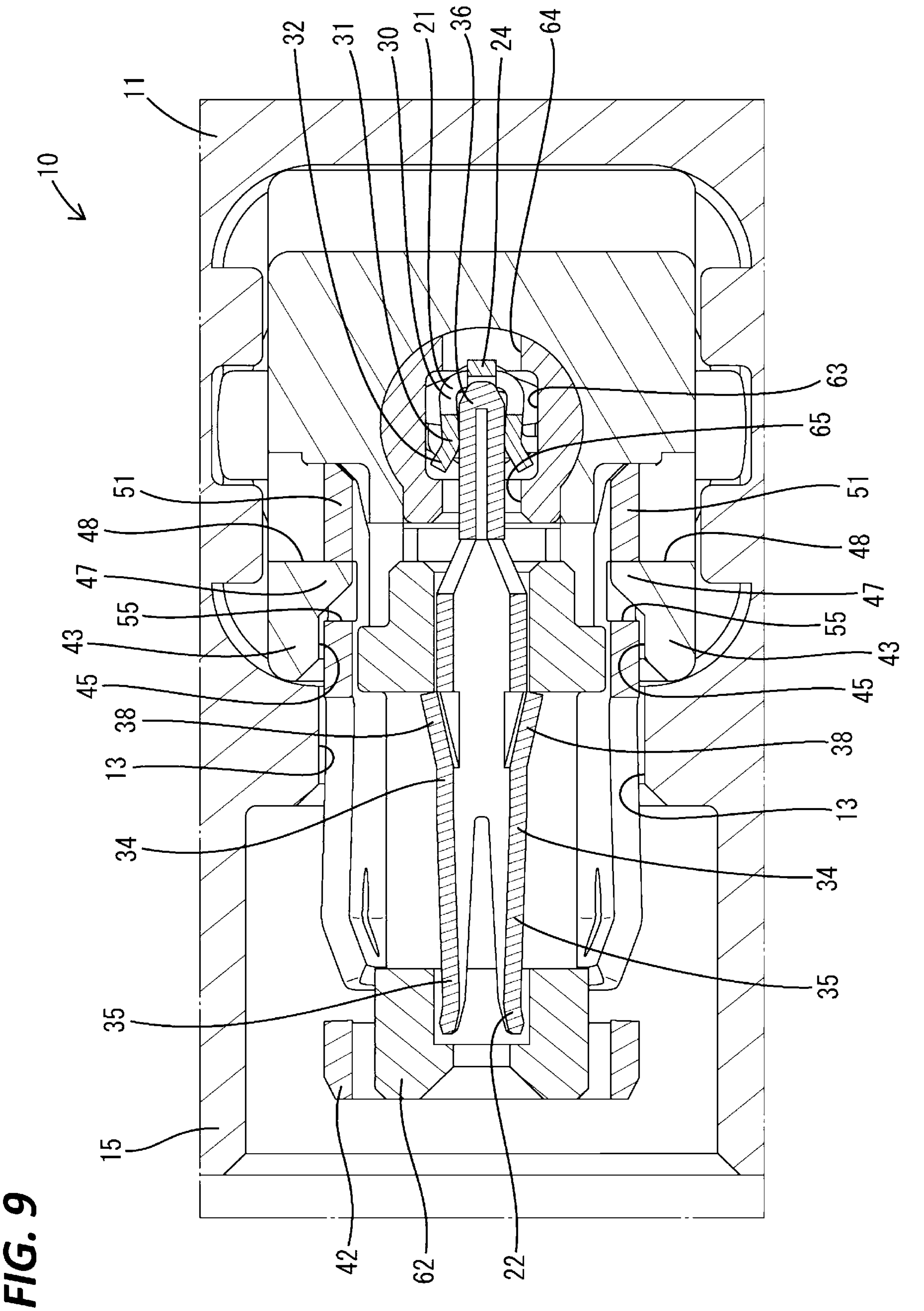
FIG. 9 is a cross-sectional view of a region including the first inner conductor, the second inner conductor, the first outer conductor, the second outer conductor, the first dielectric, and the second dielectric, at a cross-section taken along line C-C in FIG. 5.

As shown in FIGS. 3 and 9, the first lock portions 47 are provided inward of the conductor-side fitting hole 45 in the accommodation portion 43. A pair of first lock portions 47 are provided on the left and right sides. The first lock portions 47 are shaped so as to project inward from inner peripheral faces of the accommodation portion 43. The front faces of the first lock portions 47 are inclined rearward while extending toward the center of the accommodation portion 43 in a view from the front. The rear faces of the first lock portions 47 extend along the up-down direction and the left-right direction.

As shown in FIGS. 3 and 9, the through holes 48 are formed at positions corresponding to the pair of first lock portions 47. In the present embodiment, the "positions corresponding to the pair of first lock portions" are rearward of the first lock portions 47 (i.e., deeper than the first lock portions 47 inside the accommodation portion 43). The through holes 48 connect the inner space of the accommodation portion 43 to the space outside. The through holes 48 are die-cut holes formed when the first outer conductor 41 is manufactured.

Figure 2:
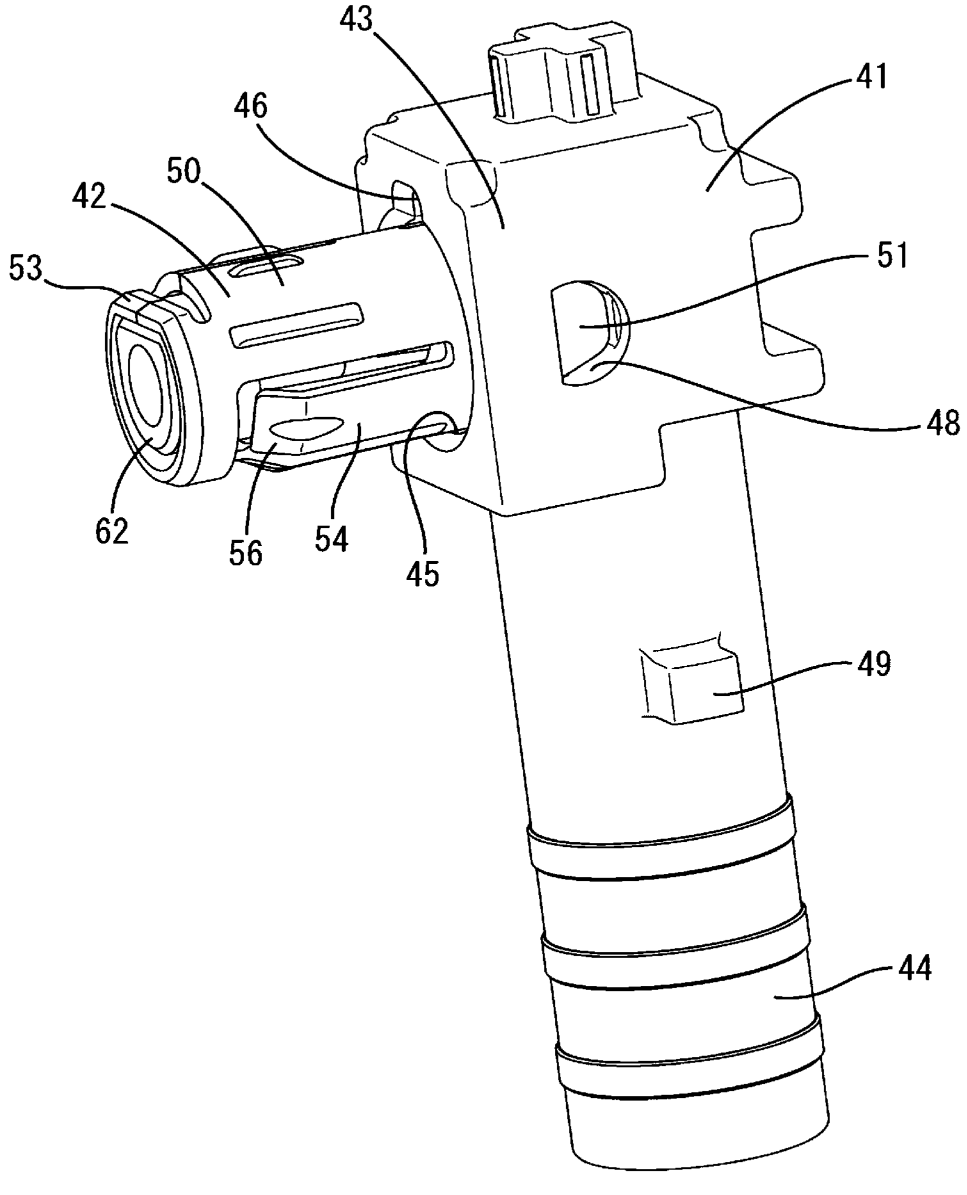
FIG. 2 is a perspective view of a first inner conductor, a second inner conductor, a first outer conductor, a second outer conductor, a first dielectric, and a second dielectric in an assembled state.

As shown in FIG. 2, the sleeve positioning portions 49 are shaped so as to project from outer peripheral faces of the tubular portion 44. The sleeve positioning portions 49 respectively project from the left and right sides of the tubular portion 44. As shown in FIG. 8, the sleeve 70 is arranged below the sleeve positioning portions 49. The sleeve positioning portions 49 restrict upward movement of the sleeve 70.

Configuration of First Dielectric 61

The first dielectric 61 corresponds to an example of the "dielectric" of the present invention. As shown in FIGS. 5, 6 and 10, the first dielectric 61 is arranged between the first inner conductor 21 and the first outer conductor 41. The first dielectric 61 includes a cavity 63, a locking hole 64, an entry hole 65, a guide groove 66, and a stabilizer fitting groove 67.

The cavity 63 extends along the up-down direction as shown in FIG. 5. The cavity 63 is open on the lower side of the first dielectric 61.

As shown in FIG. 6, the locking hole 64 is formed in an inner peripheral face of the cavity 63 (more specifically, the rearward inner peripheral face). The locking portion 24 of the first inner conductor 21 enters the locking hole 64.

As shown in FIG. 6, the entry hole 65 is formed in an inner peripheral face of the cavity 63 (more specifically, the forward inner peripheral face). The entry hole 65 is formed at a position opposing the locking hole 64 in the front-rear direction. The second inner conductor 22 enters the entry hole 65 and is arranged therein. The locking hole 64 and the entry hole 65 are arranged coaxially with each other via the cavity 63.

As shown in FIG. 6, the guide groove 66 is formed in an inner peripheral face of the cavity 63. The guide groove 66 extends along the up-down direction and is in communication with the locking hole 64.

As shown in FIG. 10, the stabilizer fitting groove 67 is formed in an inner peripheral face of the cavity 63. The stabilizer fitting groove 67 extends along the up-down direction. The stabilizer fitting groove 67 is formed at a position corresponding to the stabilizer 25 of the first inner conductor 21. The stabilizer 25 of the first inner conductor 21 enters the stabilizer fitting groove 67.

Configuration of Second Inner Conductor 22

The second inner conductor 22 is a plate-shaped member, and is formed by bending a metal plate. The second inner conductor 22 extends in the front-rear direction as shown in FIGS. 4 and 6. The second inner conductor 22 is connected in a direction intersecting (more specifically, orthogonal to) the first inner conductor 21. The second inner conductor 22 is L-shaped likewise to the first inner conductor 21. The second inner conductor 22 includes a second inner conductor body 34, an inner-conductor-side partner connection portion 35, a second connection portion 36, inner-conductor-side protruding portions 37, and retaining projections 38.

As shown in FIGS. 4 and 6, the second inner conductor body 34 is shaped as a tube (more specifically, a cylinder) that extends in the front-rear direction.

As shown in FIGS. 4 and 6, the inner-conductor-side partner connection portion 35 is located forward of the second inner conductor body 34. The inner-conductor-side partner connection portion 35 is electrically connected to the partner inner conductor 92 (see FIG. 5) of the partner connector 90.

As shown in FIGS. 4 and 6, the second connection portion 36 is located rearward of the second inner conductor body 34. The second connection portion 36 is configured as a tab. The second connection portion 36 projects rearward from the rear end of the second dielectric 62. The second connection portion 36 is electrically connected to the first connection portion 31 of the first inner conductor 21.

As shown in FIG. 6, the inner-conductor-side protruding portions 37 are provided on the outer peripheral surface of the second inner conductor body 34 and project upward from the outer peripheral surface. When the second inner conductor 22 is inserted into the second dielectric 62 and the inner-conductor-side protruding portion 37 comes into contact with the rear face of the second dielectric 62, the second inner conductor 22 is restricted from moving forward of the second dielectric 62.

As shown in FIG. 9, the retaining projections 38 are respectively provided on the left and right sides of the second inner conductor body 34 and project outward in the left-right direction. The retaining projections 38 prevent the second inner conductor 22 from coming out rearward when normally inserted into the second dielectric 62.

Configuration of Second Outer Conductor 42

The second outer conductor 42 is a plate-shaped member, and is formed by bending a metal plate. The second outer conductor 42 surrounds the second inner conductor 22 as shown in FIG. 6. The second outer conductor 42 is shaped as a tube (more specifically, a cylinder) that extends in the front-rear direction. The second outer conductor 42 is open on the front and rear sides. As shown in FIG. 3, the second outer conductor 42 includes an outer conductor body 50, second lock portions 51, protruding portions 52, a front stop portion 53, and partner connection portions 54.

As shown in FIG. 3, the outer conductor body 50 is shaped as a tube (more specifically, a cylinder).

As shown in FIGS. 3 and 9, the second lock portions 51 project rearward from the outer conductor body 50. The second lock portions 51 are supported in a cantilevered manner by the outer conductor body 50. The second lock portions 51 are respectively provided on the left and right sides of the outer conductor body 50. The second lock portions 51 are plate-shaped and can undergo bending deformation toward the center of the second outer conductor 42 (i.e., radially inward) in a view from the front. The second lock portions 51 each include a lock hole 55 that passes the second lock portion 51. When the first lock portions 47 are fitted into the lock holes 55, the second lock portions 51 are locked to the first lock portions 47 of the first outer conductor 41.

As shown in FIG. 3, the protruding portions 52 project upward from the upper face of the outer conductor body 50. The protruding portions 52 are provided at the rear end portion of the outer conductor body 50.

As shown in FIG. 3, the front stop portion 53 is arranged forward of the outer conductor body 50. The front stop portion 53 restricts forward movement of the second dielectric 62 arranged inside the second outer conductor 42.

As shown in FIG. 3, the partner connection portions 54 are supported by the outer conductor body 50. Portions of the outer conductor body 50 are cut out. The partner connection portions 54 are arranged in these cutout portions. The partner connection portions 54 are cantilevered due to the rear end portions thereof being supported by peripheral edge portions of the cutout portions of the outer conductor body 50. The partner connection portions 54 can undergo bending deformation. The partner connection portions 54 elastically come into contact with the partner outer conductor 93 (see FIG. 5) of the partner connector 90 so as to be electrically connected thereto. The partner connection portions 54 each have a guiding face 56 that guides the partner outer conductor 93 during connection to the partner outer conductor 93. The guiding faces 56 are formed at the front end portions of the partner connection portions 54. The guiding faces 56 are inclined radially outward while extending rearward. The guiding faces 56 guide the partner outer conductor 93 outward in the radial direction of the partner connection portions 54. The radially outward sides of the partner connection portions 54 are electrically connected to the partner outer conductor 93.

Configuration of Second Dielectric 62

As shown in FIG. 6, the second dielectric 62 is arranged between the second inner conductor 22 and the second outer conductor 42. The second dielectric 62 is shaped as a tube (more specifically, a cylinder).

Other Configurations

The sleeve 70 shown in FIG. 5 is shaped as a tube (more specifically, a cylinder). The sleeve 70 is made of a metal, for example. The first seal member 71 and the second seal member 72 shown in FIG. 5 are shaped as a tube (more specifically, a cylinder). The first seal member 71 and the second seal member 72 are made of rubber, for example. The first seal member 71 is attached to the outer surface of the electric wire 80. The second seal member 72 is attached to the outer surface of the inner hood portion 15 of the housing 11. The retaining member 73 is a member for preventing the first seal member 71 arranged in the housing 11 from coming off. As shown in FIGS. 1 and 5, the retaining member 73 includes an insertion hole 74 and second retaining and locking portions 75. The electric wire 80 is inserted into the insertion hole 74. The second retaining and locking portions 75 are locked to the first retaining and locking portions 18 of the housing 11.

Assembly of Connector 10

The following description is given mainly with reference to FIG. 5. First, the retaining member 73, the first seal member 71, and the sleeve 70 are attached to the electric wire 80 in this order from the leading end side. The sheath 84 is then removed from the leading end portion of the electric wire 80 so as to expose the shield layer 83. The insulator 82 is then removed from a portion of the electric wire 80 further closer to the leading end so as to expose the inner conductor 81. The exposed inner conductor 81 is crimped in the barrel portion 26 of the first inner conductor 21.

The first inner conductor 21 is inserted into the cavity 63 of the first dielectric 61 from below. The first inner conductor 21 is inserted into the cavity 63 in such a manner that the stabilizer 25 is fitted into the stabilizer fitting groove 67 of the first dielectric 61. In the process of inserting the first inner conductor 21 into the cavity 63, the locking portion 24 of the first inner conductor 21 is fitted into the guide groove 66 formed in the inner peripheral surface of the cavity 63, and slides upward along the guide groove 66. When fitted in the guide groove 66, the locking portion 24 undergoes bending deformation due to receiving reaction force from the bottom face of the guide groove 66. When the first inner conductor 21 has been inserted to the normal insertion position, the locking portion 24 enters the locking hole 64 in communication with the guide groove 66 due to elastic return force. As a result, the first inner conductor 21 is locked to the first dielectric 61 and is restricted from coming downward out of the cavity 63. In the state where the locking portion 24 has entered the locking hole 64, the opening between the pair of first connection portions 31 faces the entry hole 65 of the first dielectric 61.

The first dielectric 61 is inserted into the first outer conductor 41 from below. When the first dielectric 61 has been inserted to the normal insertion position, the entry hole 65 is aligned with the conductor-side fitting hole 45 of the first outer conductor 41 in the front-rear direction. The outer peripheral surface of the tubular portion 44 of the first outer conductor 41 is covered by the exposed shield layer 83 and crimped by the sleeve 70. As a result, the first outer conductor 41 is electrically connected to the shield layer 83 of the electric wire 80.

The first outer conductor 41 is inserted into the housing body 12 of the housing 11 from below. When the first outer conductor 41 has been inserted to the normal insertion position, the conductor-side fitting hole 45 of the first outer conductor 41 is aligned with the fitting hole 13 of the housing 11 in the front-rear direction, and the conductor-side fitting groove 46 of the first outer conductor 41 is aligned with the fitting groove 14 of the housing 11 in the front-rear direction. As shown in FIG. 9, the first lock portions 47 are arranged so as to face the rear side of the fitting hole 13. After insertion of the first outer conductor 41, the second retaining and locking portions 75 of the retaining member 73 are locked to the first retaining and locking portions 18 of the housing 11.

The second inner conductor 22 is inserted into the second dielectric 62 from behind. When the second inner conductor 22 has been inserted to the normal insertion position, movement of the second inner conductor 22 in the front-rear direction relative to the second dielectric 62 is restricted by the inner-conductor-side protruding portions 37 and the retaining projections 38. The second dielectric 62 is inserted into the second outer conductor 42 from behind. The second dielectric 62 restricted from moving forward upon abutting against the front stop portion 53 of the second outer conductor 42. The second outer conductor 42 is fitted into the fitting hole 13 of the housing 11 from the front side in such a manner that the protruding portions 52 fit into the fitting groove 14 of the housing 11. As the fitting of the second outer conductor 42 progresses, the second outer conductor 42 is fitted into the conductor-side fitting hole 45 of the first outer conductor 41, and the protruding portions 52 of the second outer conductor 42 are fitted into the conductor-side fitting groove 46 of the first outer conductor 41.

In the process in which the second outer conductor 42 is fitted into the conductor-side fitting hole 45 in the accommodation portion 43, the second lock portions 51 are pressed by the first lock portions 47 so as to undergo bending deformation in the inward direction. As the fitting progresses further, the first lock portions 47 are fitted into the lock holes 55 of the second lock portion 51, and the second lock portions 51 return to their original shape due to elastic return force. As a result, the second lock portions 51 are locked to the first lock portions 47.

When the second lock portions 51 are locked to the first lock portions 47, the second outer conductor 42 is coupled to the first outer conductor 41. The first outer conductor 41 is configured so as not to come out from the inside of the housing body 12 to the fitting hole 13. For this reason, even if the second outer conductor 42 that is coupled to the first outer conductor 41 is pulled in the direction of coming out of the fitting hole 13, the first outer conductor 41 is caught in the housing body 12. In other words, in the state where the second lock portions 51 are locked to the first lock portions 47, the second outer conductor 42 is retained in the fitting hole 13.

In the process in which the second outer conductor 42 is fitted into the conductor-side fitting hole 45 in the accommodation portion 43, the second connection portion 36 of the second inner conductor 22 enters the entry hole 65 of the first dielectric 61, and moves forward while spreading apart the pair of first connection portions 31. In the state where the second inner conductor 22 has been normally connected to the first inner conductor 21, the second inner conductor 22 is sandwiched between the pair of first connection portions 31 of the first inner conductor 21, and the leading end of the second connection portion 36 of the second inner conductor 22 is arranged inward of the receding face 24B. At this time, the leading end of the second connection portion 36 of the second inner conductor 22 does not come into contact with the receding face 24B.

Note that a later-described second outer conductor 42B, which is different from the second outer conductor 42, can be fitted into the accommodation portion 43 of the first outer conductor 41. In other words, the connector 10 is configured such that any one of a plurality of types of second outer conductors (in the present embodiment, either the second outer conductor 42 or the second outer conductor 42B) can be coupled to the first outer conductor 41. The second outer conductor 42B includes an outer conductor body 50B, second lock portions 51B, protruding portions 52B, and partner connection portions 54B.

The outer conductor body 50B is shaped as a tube (more specifically, a cylinder) that extends in the front-rear direction. The second lock portions 51B are arranged rearward of the outer conductor body 50B.

The second lock portions 51B are respectively provided on the left and right sides of the second outer conductor 42B. A second lock hole 55B is formed in each of the second lock portions 51B. The second lock portions 51B have the same shape as the second lock portions 51.

The protruding portions 52B are provided on the outer peripheral surface of the outer conductor body 50B. The protruding portions 52B project upward from the upper end portion of the outer peripheral surface of the outer conductor body 50B. The protruding portions 52B have the same shape as the protruding portions 52.

The partner connection portions 54B are supported in a cantilevered manner by the front end of the outer conductor body 50B, and are shaped so as to project forward. A plurality of (six in the present embodiment) partner connection portions 54B are provided at equal intervals in the circumferential direction. The partner connection portions 54B can undergo bending deformation. The partner connection portions 54B elastically come into contact with the partner outer conductor 93 (see FIG. 5) of the partner connector 90 so as to be electrically connected thereto. The partner connection portions 54B each have a guiding face 56B that guides the partner outer conductor 93 during connection to the partner outer conductor 93.

The guiding faces 56B are formed at the front end portions of the partner connection portions MB. The guiding faces 56B are inclined radially inward while extending rearward. The guiding faces 56B guide the partner outer conductor 93 inward in the radial direction of the partner connection portions 54B. The radially inward sides of the partner connection portions MB are electrically connected to the partner outer conductor 93.

In other words, the second lock portions 51 and the second lock portions 51B have the same shape as each other, and are shaped so as to be locked to the first lock portions 47. For this reason, when either the second outer conductor 42 or the second outer conductor 42B is selected and fitted into the accommodation portion 43 of the first outer conductor 41, the second lock portions of the fitted second outer conductor are locked to the first lock portions 47 of the first outer conductor 41, and the second outer conductor is coupled to the first outer conductor 41. As a result, the second outer conductor is electrically connected to the first outer conductor 41. On the other hand, the partner connection portions 54 and the partner connection portions 54B have different shapes from each other, and are shaped so as to be connected to partner connection portions that have different shapes from each other. For this reason, the partner connector that corresponds to the second outer conductor that is coupled to the first outer conductor 41 can be fitted to the connector 10.

Effects of Connector 10

The first outer conductor 41 of the connector 10 is a member formed with a tubular shape by casting or cutting, and therefore the first outer conductor 41 can be formed so as to suppress the formation of a gap, thus making it possible to improve the shielding performance of the first outer conductor 41.

Here, if the second outer conductor 42 is also a member formed with a tubular shape by casting or cutting, both the first outer conductor 41 and the second outer conductor 42 do not easily deform, and thus can conceivably be coupled to each other by press fitting. However, in the case of coupling by press fitting, the dimensional tolerance between the first outer conductor 41 and the second outer conductor 42 needs to be reduced in order to ensure electrical connection reliability, which may increase difficulty in manufacturing the first outer conductor 41 and the second outer conductor 42. In view of this, according to the connector 10, the second outer conductor 42 is a plate-shaped member and includes the second lock portions 51 that can undergo bending deformation. Therefore, if the second lock portions 51 undergo bending deformation in order to become locked to the first lock portions 47 of the first outer conductor 41, the dimensional tolerance between the first outer conductor 41 and the second outer conductor 42 can be large, the first outer conductor 41 and the second outer conductor 42 can be manufactured easily, and it is possible to realize coupling with high electrical connection reliability. Also, due to being plate-shaped, the second outer conductor 42 can be manufactured at low cost.

Moreover, a portion of the second outer conductor 42 enters the accommodation portion 43, thus making it possible to reduce the height of the connector 10 in the direction in which the second outer conductor 42 projects from the first outer conductor 41.

Also, the second lock portions 51 of the second outer conductor 42 are arranged at positions that close the through holes 48 when the second outer conductor 42 is fitted to the accommodation portion 43. This therefore makes it possible to suppress a decrease in the shielding performance of the first outer conductor 41 and the second outer conductor 42.

Also, the second outer conductor 42 includes the partner connection portions 54 that come into contact with the partner outer conductor of the partner connector 90. For this reason, according to the connector 10, it is possible to improve the electrical connection reliability between the second outer conductor 42 and the partner outer conductor 93. Also, due to the second outer conductor 42 being a plate-shaped member, it is possible to easily form the partner connection portions 54 that are capable of elastic contact.

Also, the connector 10 has a configuration in which either one of the two types of second outer conductor 42 and 42B can be selected and coupled to the first outer conductor 41, and the two types of second outer conductors 42 and 42B respectively include the partner connection portions 54 and 54B that have different shapes from each other. This therefore makes it possible to manufacture a plurality of types of connectors that can be fitted to various types of partner outer conductors while also including the same first outer conductor 41.

Also, in the connector 10, the locking portion 24 is locked to the locking hole 64, thus suppressing the case where the first inner conductor 21 comes off from the first dielectric 61. Moreover, the locking portion 24 is shaped as a double-supported beam whose upper and lower end portions are supported by the first inner conductor body 23. For this reason, according to this connector 10, a decrease in the impedance of the first inner conductor 21 can be suppressed more than in the case of a configuration in which the locking portion is a lance.

Also, the locking portion 24 is curved. For this reason, according to the connector 10, it is possible to reduce the insertion force required when inserting the first inner conductor 21 into the first dielectric 61.

Also, the locking hole 64 and the entry hole 65 of the first dielectric 61 are arranged coaxially with each other via the cavity 63. For this reason, the locking hole 64 and the entry hole 65 can be punched out at the same time using the same straight die during manufacturing of the connector 10.

Also, in a state where the second inner conductor 22 is normally connected to the first inner conductor 21, the leading end of the second connection portion 36 of the second inner conductor 22 is arranged inward of the receding face 24B. For this reason, if the first inner conductor 21 is in a partially-inserted state, the leading end of the second connection portion 36 is abutted against the first inner conductor 21. Therefore, it can be easily determined whether or not the first inner conductor 21 is in the partially-inserted state. In particular, in the present embodiment, in the state where the leading end of the second inner conductor 22 is abutted against the first inner conductor 21, the second lock portions 51 of the second outer conductor 42 do not become locked to the first lock portions 47 of the first outer conductor 41. For this reason, based on this non-locked state, it is possible to more easily determine that the first inner conductor 21 is in the partially-inserted state.

Also, the guide groove 66 is formed on the inner peripheral surface of the cavity 63, and the guide groove 66 extends along the up-down direction and is in communication with the locking hole 64. For this reason, according to the connector 10, while being inserted into the cavity 63, the locking portion 24 of the first inner conductor 21 can be guided to the locking hole 64 by the guide groove 66.

Also, in the state where the first outer conductor 41 is located at the normal insertion position, the first lock portions 47 of the connector 10 are arranged so as to face the back side in the fitting direction of the second outer conductor 42 in the fitting hole 13. The second lock portions 51 then become locked to the first lock portions 47. In the state where the second lock portions 51 are locked to the first lock portions 47, the second outer conductor 42 is retained in the fitting hole 13. In opposite terms, according to this connector 10, if the first outer conductor 41 is in the partially-inserted state, the positions of the second lock portions 51 and the first lock portions 47 are not aligned with each other, and thus the second lock portions 51 do not become locked to the first lock portions 47, and the second outer conductor can come out of the fitting hole. For this reason, according to this connector 10, it is possible to suppress the case where the first outer conductor 41 and the second outer conductor 42 become locked to each other while in the partially-inserted state.

Also, the housing 11 includes the fitting groove 14 that is formed in the inner peripheral surface of the fitting hole 13 and extends along the fitting direction of the second outer conductor 42, and the second outer conductor 42 includes the protruding portions 52 that fit into the fitting groove 14 in the process of fitting to the first outer conductor 41. For this reason, according to the connector 10, the second outer conductor 42 can be positioned relative to the housing 11 in the circumferential direction.

Also, the housing 11 is L-shaped and does not including a housing lock portion by which the first outer conductor 41 and the second outer conductor 42 are locked to the housing 11, and therefore the first outer conductor 41 and the second outer conductor 42 can easily separate from the housing 11 when not coupled to each other. Therefore, according to this configuration, it is easy to check whether or not the first outer conductor 41 and the second outer conductor 42 are correctly coupled.

Also, in the connector 10, in the state where the second lock portions 51 are locked to the first lock portions 47, the protruding portions 52 of the second outer conductor 42 are fitted into the conductor-side fitting groove 46 of the first outer conductor 41, and therefore the second outer conductor 42 can be positioned relative to the first outer conductor 41 in the circumferential direction.

Also, the shield layer 83 of the electric wire 80 is electrically connected to the first outer conductor 41. The first outer conductor 41 is electrically connected to the second outer conductor 42, and the partner outer conductor 93 of the partner connector 90 is electrically connected to the second outer conductor 42. The second outer conductor 42 extends in a direction intersecting (more specifically, orthogonal to) the extending direction of the first outer conductor 41. For this reason, according to this connector 10, it is possible to change the route in the direction intersecting the extending direction of the electric wire 80.

Other Embodiments of Present Disclosure

The embodiments disclosed in the present embodiment are illustrative in all respects and not intended to be construed as limiting.

(1) Although the connector is L-shaped in the above embodiment, the connector does not need to be L-shaped. For example, the connector may be I-shaped (have a straight shape).

(2) Although the second outer conductor closes the through hole of the first outer conductor in the above embodiment, a configuration is possible in which the second outer conductor does not close the through hole.

(3) Although the partner connection portion is configured to come into elastic contact with the partner outer conductor in the above embodiment, the partner connection portion does not need to come into elastic contact with the partner outer conductor.

(4) Although the entry hole is arranged coaxially with the locking hole in the above embodiment, the entry hole and the locking hole do not need to be arranged coaxially.

(5) Although the leading end of the second inner conductor is arranged inward of the receding face of the locking portion in the first inner conductor in the above embodiment, the leading end of the second inner conductor does not need to be arranged inward of the receding face. For example, the leading end of the second inner conductor may be arranged outward of (forward of) the open end of the receding face.

(6) Although the leading end of the second inner conductor does not come into contact with the receding face of the locking portion of the first inner conductor in the above embodiment, the leading end of the second inner conductor may come into contact with the receding face.

(7) Although the guide groove is formed on the inner peripheral surface of the cavity in the above embodiment, a configuration is possible in which the guide groove is not formed.

(8) Although the electric wire is a coaxial cable in the above embodiment, the electric wire does not need to be a coaxial cable, and may be a cable for differential signal transmission, for example.

(9) Although only a portion of the second outer conductor is inserted into the accommodation portion of the first outer conductor in the above embodiment, the entirety of the second outer conductor may be inserted into the accommodation portion.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector comprising:

an inner conductor;

an outer conductor configured to surround the inner conductor; and a dielectric arranged between the inner conductor and the outer conductor, wherein the dielectric includes:

a cavity extending in a predetermined direction, and a locking hole formed in an inner peripheral face of the cavity, the inner conductor includes:

an inner conductor body arranged in the cavity, and a locking portion that bulges from the inner conductor body and is configured to enter and be locked to the locking hole, and the locking portion extends in the predetermined direction and is shaped as a double-supported beam whose upper and lower end portions are supported by the inner conductor body.

2. The connector according to claim 1, wherein the locking portion is curved.

3. The connector according to claim 1, further comprising:

a second inner conductor configured to be electrically connected to the inner conductor, wherein an entry hole is formed in an inner peripheral face of the cavity at a position corresponding to the locking hole, the second inner conductor is arranged in the entry hole, and the locking hole and the entry hole are arranged coaxially with each other via the cavity.

4. The connector according to claim 3, wherein the locking portion includes a protruding face bulging from the inner conductor body, and a receding face formed on a reverse side of the protruding face, and in a state where the second inner conductor is normally connected to the inner conductor, a leading end of the second inner conductor is arranged inward of the receding face.

5. The connector according to claim 1, wherein a guide groove is formed in an inner peripheral face of the cavity, and the guide groove extends along the predetermined direction and is in communication with the locking hole.

* * * * *